(12) United States Patent
Mountain

(10) Patent No.: US 9,936,248 B2
(45) Date of Patent: Apr. 3, 2018

(54) MEDIA CONTENT OUTPUT CONTROL

(71) Applicant: ECHOSTAR UK HOLDINGS LIMITED, Steeton (GB)

(72) Inventor: Dale Llewelyn Mountain, Keighley (GB)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 14/470,248

(22) Filed: Aug. 27, 2014

(65) Prior Publication Data

US 2016/0066020 A1  Mar. 3, 2016

(51) Int. Cl.
| | |
|---|---|
| *H04N 7/20* | (2006.01) |
| *H04N 21/439* | (2011.01) |
| *H04N 5/60* | (2006.01) |
| *H04N 21/485* | (2011.01) |
| *H04N 21/414* | (2011.01) |
| *H04N 21/45* | (2011.01) |
| *H04N 21/466* | (2011.01) |
| *H04N 21/475* | (2011.01) |
| *H04N 21/61* | (2011.01) |
| *H04N 21/454* | (2011.01) |

(52) U.S. Cl.
CPC ............ *H04N 21/439* (2013.01); *H04N 5/60* (2013.01); *H04N 21/41407* (2013.01); *H04N 21/4396* (2013.01); *H04N 21/4532* (2013.01); *H04N 21/4542* (2013.01); *H04N 21/4667* (2013.01); *H04N 21/4755* (2013.01); *H04N 21/4852* (2013.01); *H04N 21/6143* (2013.01)

(58) Field of Classification Search
CPC combination set(s) only.
See application file for complete search history.

(56) References Cited

U.S. PATENT DOCUMENTS

| | | |
|---|---|---|
| 6,005,562 A | 12/1999 | Shiga et al. |
| 6,177,931 B1 | 1/2001 | Alexander et al. |
| 6,529,230 B1 | 3/2003 | Chong |
| 6,681,396 B1 | 1/2004 | Bates et al. |
| 6,774,924 B2 | 8/2004 | Kato et al. |
| 7,174,512 B2 | 2/2007 | Martin et al. |
| 7,197,715 B1 | 3/2007 | Valeria |
| 7,633,887 B2 | 12/2009 | Panwar et al. |
| 7,680,894 B2 | 3/2010 | Diot et al. |
| 7,774,811 B2 | 8/2010 | Poslinski et al. |
| 7,818,368 B2 | 10/2010 | Yang et al. |

(Continued)

FOREIGN PATENT DOCUMENTS

| | | |
|---|---|---|
| EP | 1 865 716 A2 | 12/2007 |
| EP | 2 309 733 B1 | 4/2011 |

(Continued)

OTHER PUBLICATIONS

U.S. Appl. No. 14/200,864, filed Mar. 7, 2014 Final Office Action dated Jun. 18, 2015, 36 pages.

(Continued)

*Primary Examiner* — Alexander Gee
(74) *Attorney, Agent, or Firm* — Kilpatrick Townsend & Stockton LLP

(57) ABSTRACT

Control, based upon one or more pre-determined and user-configurable criterion, the loudness or intensity of audio as output by a television or handheld mobile device.

20 Claims, 7 Drawing Sheets

(56) References Cited

U.S. PATENT DOCUMENTS

| | | | |
|---|---|---|---|
| 7,825,989 B1 | 11/2010 | Greenberg | |
| 7,849,487 B1 | 12/2010 | Vosseller | |
| 8,024,753 B1* | 9/2011 | Kummer | H04N 21/435 |
| | | | 725/25 |
| 8,046,798 B1 | 10/2011 | Schlack et al. | |
| 8,079,052 B2 | 12/2011 | Chen et al. | |
| 8,104,065 B2 | 1/2012 | Aaby et al. | |
| 8,209,713 B1 | 6/2012 | Lai et al. | |
| 8,296,797 B2 | 10/2012 | Olstad et al. | |
| 8,312,486 B1 | 11/2012 | Briggs et al. | |
| 8,424,041 B2 | 4/2013 | Candelore et al. | |
| 8,427,356 B1 | 4/2013 | Satish | |
| 8,627,349 B2 | 1/2014 | Kirby et al. | |
| 8,667,527 B2 | 3/2014 | Yan et al. | |
| 8,689,258 B2 | 4/2014 | Kemp | |
| 8,752,084 B1 | 6/2014 | Lai et al. | |
| 8,855,681 B1 | 10/2014 | George et al. | |
| 8,973,038 B2 | 3/2015 | Gratton | |
| 8,973,068 B2 | 3/2015 | Kotecha et al. | |
| 8,990,418 B1* | 3/2015 | Bragg | H04N 21/25891 |
| | | | 709/203 |
| 9,038,127 B2 | 5/2015 | Hastings et al. | |
| 9,066,156 B2 | 6/2015 | Kapa | |
| 9,213,986 B1* | 12/2015 | Buchheit | G06Q 30/0276 |
| 9,253,533 B1 | 2/2016 | Morgan et al. | |
| 9,264,779 B2 | 2/2016 | Kirby et al. | |
| 9,420,333 B2 | 8/2016 | Martch et al. | |
| 9,426,516 B2 | 8/2016 | Kemp | |
| 9,565,474 B2 | 2/2017 | Petruzzelli et al. | |
| 9,602,875 B2 | 3/2017 | Hussain | |
| 9,609,379 B2 | 3/2017 | Martch et al. | |
| 9,621,959 B2 | 4/2017 | Mountain | |
| 9,681,176 B2 | 6/2017 | Mountain | |
| 9,681,196 B2 | 6/2017 | Mountain | |
| 2001/0013123 A1 | 8/2001 | Freeman et al. | |
| 2001/0026609 A1 | 10/2001 | Weinstein et al. | |
| 2002/0059610 A1 | 5/2002 | Ellis | |
| 2002/0067376 A1 | 6/2002 | Martin et al. | |
| 2002/0075402 A1 | 6/2002 | Robson et al. | |
| 2002/0164155 A1 | 11/2002 | Mate | |
| 2002/0174430 A1 | 11/2002 | Ellis et al. | |
| 2002/0178444 A1 | 11/2002 | Trajkovic et al. | |
| 2003/0023742 A1 | 1/2003 | Allen et al. | |
| 2003/0056220 A1* | 3/2003 | Thornton | H04L 29/06027 |
| | | | 725/62 |
| 2003/0066076 A1 | 4/2003 | Minahan | |
| 2003/0066077 A1 | 4/2003 | Gutta et al. | |
| 2003/0118014 A1 | 6/2003 | Iyer et al. | |
| 2003/0126605 A1 | 7/2003 | Betz et al. | |
| 2003/0126606 A1 | 7/2003 | Buczak et al. | |
| 2003/0154485 A1 | 8/2003 | Johnson et al. | |
| 2003/0188317 A1 | 10/2003 | Liew et al. | |
| 2003/0189674 A1 | 10/2003 | Inoue et al. | |
| 2003/0208763 A1 | 11/2003 | McElhatten et al. | |
| 2003/0229899 A1 | 12/2003 | Thompson et al. | |
| 2004/0019489 A1 | 1/2004 | Funk et al. | |
| 2004/0181807 A1 | 9/2004 | Theiste et al. | |
| 2005/0030977 A1 | 2/2005 | Casey et al. | |
| 2005/0044570 A1 | 2/2005 | Poslinski | |
| 2005/0071865 A1 | 3/2005 | Martins | |
| 2005/0125302 A1 | 6/2005 | Brown et al. | |
| 2005/0152565 A1* | 7/2005 | Jouppi | H04R 27/00 |
| | | | 381/309 |
| 2005/0166230 A1 | 7/2005 | Gaydou et al. | |
| 2005/0180568 A1 | 8/2005 | Krause | |
| 2005/0191041 A1* | 9/2005 | Braun | G11B 27/034 |
| | | | 386/243 |
| 2005/0240961 A1 | 10/2005 | Jerding et al. | |
| 2005/0264705 A1 | 12/2005 | Kitamura | |
| 2005/0275758 A1 | 12/2005 | McEvilly et al. | |
| 2006/0020962 A1 | 1/2006 | Stark et al. | |
| 2006/0085828 A1 | 4/2006 | Dureau et al. | |
| 2006/0089870 A1 | 4/2006 | Myhr | |
| 2006/0174277 A1 | 8/2006 | Sezan et al. | |
| 2006/0190615 A1 | 8/2006 | Panwar et al. | |
| 2006/0238656 A1 | 10/2006 | Chen et al. | |
| 2006/0253581 A1 | 11/2006 | Dixon et al. | |
| 2006/0282852 A1 | 12/2006 | Purpura et al. | |
| 2006/0282869 A1 | 12/2006 | Plourde, Jr. | |
| 2007/0033616 A1 | 2/2007 | Gutta | |
| 2007/0058930 A1 | 3/2007 | Iwamoto | |
| 2007/0083901 A1 | 4/2007 | Bond | |
| 2007/0127894 A1 | 6/2007 | Ando et al. | |
| 2007/0146554 A1 | 6/2007 | Strickland et al. | |
| 2007/0154163 A1 | 7/2007 | Cordray | |
| 2007/0154169 A1 | 7/2007 | Cordray et al. | |
| 2007/0157235 A1 | 7/2007 | Teunissen | |
| 2007/0157249 A1 | 7/2007 | Cordray et al. | |
| 2007/0157253 A1 | 7/2007 | Ellis et al. | |
| 2007/0157281 A1 | 7/2007 | Ellis et al. | |
| 2007/0188655 A1 | 8/2007 | Ohta | |
| 2007/0199040 A1 | 8/2007 | Kates | |
| 2007/0204302 A1 | 8/2007 | Calzone | |
| 2007/0226766 A1 | 9/2007 | Poslinski et al. | |
| 2007/0245379 A1 | 10/2007 | Agnihortri | |
| 2008/0022012 A1 | 1/2008 | Wang | |
| 2008/0060006 A1 | 3/2008 | Shanks et al. | |
| 2008/0086743 A1 | 4/2008 | Cheng et al. | |
| 2008/0097949 A1 | 4/2008 | Kelly et al. | |
| 2008/0109307 A1 | 5/2008 | Ullah | |
| 2008/0123825 A1 | 5/2008 | Abramson et al. | |
| 2008/0134043 A1 | 6/2008 | Georgis et al. | |
| 2008/0163305 A1 | 7/2008 | Johnson et al. | |
| 2008/0195457 A1 | 8/2008 | Sherman et al. | |
| 2008/0235348 A1 | 9/2008 | Dasgupta | |
| 2008/0239169 A1 | 10/2008 | Moon et al. | |
| 2008/0282312 A1 | 11/2008 | Blinnikka | |
| 2008/0300982 A1 | 12/2008 | Larson et al. | |
| 2008/0305832 A1 | 12/2008 | Greenberg | |
| 2008/0320523 A1 | 12/2008 | Morris et al. | |
| 2009/0044217 A1 | 2/2009 | Lutterbach et al. | |
| 2009/0055385 A1 | 2/2009 | Jeon et al. | |
| 2009/0102984 A1 | 4/2009 | Arling et al. | |
| 2009/0138902 A1 | 5/2009 | Kamen | |
| 2009/0150941 A1 | 6/2009 | Riedl et al. | |
| 2009/0178071 A1 | 7/2009 | Whitehead | |
| 2009/0234828 A1 | 9/2009 | Tu | |
| 2009/0249412 A1 | 10/2009 | Bhogal et al. | |
| 2009/0276803 A1 | 11/2009 | Weaver | |
| 2009/0282445 A1 | 11/2009 | Yang et al. | |
| 2009/0293093 A1 | 11/2009 | Igarashi | |
| 2009/0299824 A1 | 12/2009 | Barnes, Jr. | |
| 2009/0325523 A1 | 12/2009 | Choi | |
| 2010/0031306 A1* | 2/2010 | Pandey | H04N 7/17318 |
| | | | 725/131 |
| 2010/0040151 A1 | 2/2010 | Garrett | |
| 2010/0071007 A1 | 3/2010 | Meijer | |
| 2010/0071062 A1 | 3/2010 | Choyi et al. | |
| 2010/0083327 A1 | 4/2010 | Toba et al. | |
| 2010/0089996 A1 | 4/2010 | Koplar | |
| 2010/0115554 A1 | 5/2010 | Drouet et al. | |
| 2010/0122294 A1 | 5/2010 | Craner | |
| 2010/0146560 A1 | 6/2010 | Bonfrer | |
| 2010/0153983 A1 | 6/2010 | Phillmon et al. | |
| 2010/0153999 A1 | 6/2010 | Yates | |
| 2010/0158479 A1 | 6/2010 | Craner | |
| 2010/0166389 A1 | 7/2010 | Knee et al. | |
| 2010/0169925 A1 | 7/2010 | Takegoshi | |
| 2010/0218214 A1 | 8/2010 | Fan et al. | |
| 2010/0251295 A1 | 9/2010 | Amento et al. | |
| 2010/0262986 A1 | 10/2010 | Adimatyam et al. | |
| 2010/0269144 A1 | 10/2010 | Forsman et al. | |
| 2010/0319019 A1 | 12/2010 | Zazza | |
| 2010/0322592 A1 | 12/2010 | Casagrande | |
| 2010/0333131 A1 | 12/2010 | Parker et al. | |
| 2011/0016492 A1 | 1/2011 | Morita | |
| 2011/0019839 A1* | 1/2011 | Nandury | H03G 7/007 |
| | | | 381/107 |
| 2011/0030016 A1 | 2/2011 | Pino et al. | |
| 2011/0052156 A1 | 3/2011 | Kuhn | |
| 2011/0072448 A1 | 3/2011 | Stiers et al. | |
| 2011/0109801 A1 | 5/2011 | Thomas et al. | |
| 2011/0202956 A1 | 8/2011 | Connelly et al. | |

(56) References Cited

U.S. PATENT DOCUMENTS

| | | |
|---|---|---|
| 2011/0206342 A1 | 8/2011 | Thompson et al. |
| 2011/0239249 A1 | 9/2011 | Murison et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1* | 11/2011 | Paczkowski ............ G10L 21/06 715/716 |
| 2011/0293113 A1 | 12/2011 | McCarthy |
| 2012/0020641 A1 | 1/2012 | Sakaniwa et al. |
| 2012/0052941 A1 | 3/2012 | Mo |
| 2012/0060178 A1 | 3/2012 | Minakuchi et al. |
| 2012/0066722 A1 | 3/2012 | Cheung et al. |
| 2012/0106932 A1 | 5/2012 | Grevers, Jr. |
| 2012/0131613 A1 | 5/2012 | Ellis et al. |
| 2012/0185895 A1 | 7/2012 | Wong et al. |
| 2012/0204209 A1 | 8/2012 | Kubo |
| 2012/0230651 A1 | 9/2012 | Chen |
| 2012/0246672 A1 | 9/2012 | Sridhar et al. |
| 2012/0278837 A1 | 11/2012 | Curtis et al. |
| 2012/0311633 A1 | 12/2012 | Mandrekar et al. |
| 2013/0014159 A1 | 1/2013 | Wiser et al. |
| 2013/0042280 A1 | 2/2013 | Chen |
| 2013/0055304 A1 | 2/2013 | Kirby et al. |
| 2013/0061313 A1 | 3/2013 | Cullimore et al. |
| 2013/0074109 A1 | 3/2013 | Skelton et al. |
| 2013/0114940 A1 | 5/2013 | Merzon et al. |
| 2013/0128119 A1* | 5/2013 | Madathodiyil .... H04N 21/4852 348/563 |
| 2013/0145023 A1 | 6/2013 | Li et al. |
| 2013/0174196 A1 | 7/2013 | Herlein |
| 2013/0194503 A1 | 8/2013 | Yamashita |
| 2013/0232148 A1 | 9/2013 | MacDonald et al. |
| 2013/0243398 A1 | 9/2013 | Templeman et al. |
| 2013/0263189 A1 | 10/2013 | Garner |
| 2013/0283162 A1* | 10/2013 | Aronsson ............ G11B 27/105 715/719 |
| 2013/0298151 A1 | 11/2013 | Leske et al. |
| 2013/0332962 A1 | 12/2013 | Moritz et al. |
| 2013/0346302 A1 | 12/2013 | Purves et al. |
| 2014/0032709 A1 | 1/2014 | Saussy et al. |
| 2014/0067998 A1 | 3/2014 | Garcia et al. |
| 2014/0068675 A1 | 3/2014 | Mountain |
| 2014/0123160 A1 | 5/2014 | van Coppenolle et al. |
| 2014/0139555 A1* | 5/2014 | Levy ..................... G10H 1/18 345/636 |
| 2014/0140680 A1 | 5/2014 | Jo |
| 2014/0153904 A1 | 6/2014 | Adimatyam et al. |
| 2014/0157327 A1 | 6/2014 | Roberts et al. |
| 2014/0215539 A1 | 7/2014 | Chen et al. |
| 2014/0218517 A1 | 8/2014 | Kim et al. |
| 2014/0247931 A1 | 9/2014 | Swamy et al. |
| 2014/0282714 A1 | 9/2014 | Hussain |
| 2014/0282741 A1 | 9/2014 | Shoykhet |
| 2014/0282745 A1 | 9/2014 | Chipman et al. |
| 2014/0282759 A1 | 9/2014 | Harvey et al. |
| 2014/0294201 A1* | 10/2014 | Johnson ................. H03G 99/00 381/107 |
| 2014/0310075 A1 | 10/2014 | Ricci |
| 2014/0310819 A1 | 10/2014 | Cakarel et al. |
| 2014/0313341 A1 | 10/2014 | Stribling |
| 2014/0325556 A1 | 10/2014 | Hoang et al. |
| 2014/0331260 A1 | 11/2014 | Gratton |
| 2014/0333841 A1* | 11/2014 | Steck ..................... G06F 13/00 348/705 |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0020097 A1 | 1/2015 | Freed et al. |
| 2015/0040176 A1 | 2/2015 | Hybertson et al. |
| 2015/0052568 A1 | 2/2015 | Glennon et al. |
| 2015/0054910 A1 | 2/2015 | Offen et al. |
| 2015/0058890 A1 | 2/2015 | Kapa |
| 2015/0095932 A1 | 4/2015 | Ren |
| 2015/0118992 A1 | 4/2015 | Wyatt et al. |
| 2015/0143408 A1 | 5/2015 | Sallas |
| 2015/0156612 A1 | 6/2015 | Vemaulapalli |
| 2015/0181132 A1 | 6/2015 | Kummer et al. |
| 2015/0181279 A1 | 6/2015 | Martch et al. |
| 2015/0229981 A1 | 8/2015 | Williams et al. |
| 2015/0249803 A1 | 9/2015 | Tozer et al. |
| 2015/0249864 A1 | 9/2015 | Tang et al. |
| 2015/0310725 A1* | 10/2015 | Koskan .................. G10L 25/51 704/274 |
| 2015/0334461 A1 | 11/2015 | Yu |
| 2016/0066026 A1 | 3/2016 | Mountain |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli et al. |
| 2016/0191147 A1 | 6/2016 | Martch |
| 2016/0198229 A1 | 7/2016 | Keipert |
| 2016/0309212 A1 | 10/2016 | Martch et al. |
| 2017/0111696 A1 | 4/2017 | Petruzzelli et al. |

FOREIGN PATENT DOCUMENTS

| | | |
|---|---|---|
| EP | 2 403 239 A1 | 1/2012 |
| FR | 2 902 568 A1 | 12/2007 |
| JP | H10 322622 A | 12/1998 |
| JP | 2006-245745 A | 9/2006 |
| KR | 2004 0025073 A | 3/2004 |
| KR | 2006 0128295 A | 12/2006 |
| WO | 98/37694 A1 | 8/1998 |
| WO | 2004/068386 A1 | 8/2004 |
| WO | 2005/059807 A2 | 6/2005 |
| WO | 2007/064987 A2 | 6/2007 |
| WO | 2007/098067 A1 | 8/2007 |
| WO | 2009/073925 A1 | 6/2009 |
| WO | 2013/016626 A1 | 1/2013 |
| WO | 2014/072742 A1 | 5/2014 |
| WO | 2014/179017 A1 | 11/2014 |
| WO | 2016/030384 | 3/2016 |
| WO | 2016/030477 A1 | 3/2016 |
| WO | 2016/034899 A1 | 3/2016 |
| WO | 2016/055761 A1 | 4/2016 |

OTHER PUBLICATIONS

U.S. Appl. No. 14/095,860, filed Dec. 3, 2013 Notice of Allowance dated Jul. 13, 2015, 31 pages.

U.S. Appl. No. 14/200,864, filed Mar. 7, 2014, Non-Final Office Action dated Dec. 5, 2014, 35 pages.

U.S. Appl. No. 14/095,860, filed Dec. 3, 2013 Non-Final Office Action dated Dec. 26, 2014, 45 pages.

U.S. Appl. No. 13/886,873, filed May 3, 2013, Notice of Allowance dated Oct. 24, 2014, 40 pages.

U.S. Appl. No. 13/919,702, filed Jun. 17, 2013 Final Office Action dated Nov. 18, 2014, 24 pages.

Jin S H et al., "Intelligent broadcasting system and services for personalized semantic contents consumption", Expert Systems With Applications, Oxford, GB, vol. 31, No. 1, Jul. 1, 2006, pp. 164-173, XP024962718, ISSN: 0957-4174, DOI: 10.1016/J.ESWA.2005.09.021.

Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.

European Search Report for EP 14197940.1 dated Apr. 28, 2015, 13 pages.

U.S. Appl. No. 14/139,420, filed Dec. 23, 2013 Non-Final Office Action dated Apr. 30, 2015, 27 pages.

U.S. Appl. No. 14/095,860, filed Dec. 3, 2013 Final Office Action dated May 1, 2015, 18 pages.

U.S. Appl. No. 14/071,613, filed Nov. 4, 2013 Non-Final Office Action dated May 18, 2015, 20 pages.

U.S. Appl. No. 13/971,579, filed Aug. 20, 2013 Notice of Allowance dated Feb. 27, 2015, 28 pages.

U.S. Appl. No. 13/942,451, filed Jul. 15, 2013 Final Office Action dated Apr. 30, 2015, 33 pages.

(56) References Cited

OTHER PUBLICATIONS

U.S. Appl. No. 13/919,702, filed Jun. 17, 2013 Non-Final Office Action dated Apr. 30, 2015, 26 pages.
Extended European Search Report for EP 14160140.1 dated Jul. 7, 2014, 7 pages.
Extended European Search Report for EP 11166892.7 dated Oct. 6, 2011, 7 pages.
International Search Report and Written Opinion of PCT/US2014/033796 dated Sep. 5, 2014, 12 pages.
U.S. Appl. No. 13/919,702, filed Jun. 17, 2013 Non Final Office Action dated Jun. 11, 2014, 25 pages.
U.S. Appl. No. 13/942,451, filed Jul. 15, 2013 Non Final Office Action dated Jul. 28, 2014, 27 pages.
U.S. Appl. No. 13/971,579, filed Aug. 20, 2013 Non Final Office Action dated Oct. 28, 2014, 35 pages.
U.S. Appl. No. 14/470,279, filed Aug. 27, 2014, Preinterview first office action dated Aug. 26, 2015, 23 pages.
U.S. Appl. No. 14/479,007, filed Sep. 5, 2014, Non-Final Office Action dated Sep. 1, 2015, 44 pages.
U.S. Appl. No. 14/139,299, filed Dec. 23, 2013, Non Final Office Action dated Aug. 14, 2014, 39 pages.
International Search Report and Written Opinion for PCT/EP2015/069461 dated Oct. 1, 2015, 13 pages.
International Search Report and Written Opinion for PCT/EP2015/069456 dated Oct. 5, 2015, all pages.
International Preliminary Report on Patentability for PCT/US2014/033796 dated Nov. 3, 2015, all pages.
International Search Report and Written Opinion for PCT/EP2015/069681 dated Nov. 23, 2015, 12 pages.
U.S. Appl. No. 14/095,860, filed Dec. 3, 2013 Notice of Allowance dated Oct. 19, 2015, 14 pages.
U.S. Appl. No. 13/919,702, filed Jun. 17, 2013 Final Office Action dated Dec. 31, 2015, 30 pages.
U.S. Appl. No. 14/071,613, filed Nov. 4, 2013 Final Office Action dated Oct. 8, 2015, 11 pages.
U.S. Appl. No. 14/470,392, filed Aug. 27, 2014 Non Final Office Action dated Nov. 5, 2015, 31 pages.
U.S. Appl. No. 14/470,415, filed Aug. 27, 2014 Non Final Office Action dated Nov. 18, 2015, 28 pages.
U.S. Appl. No. 13/942,451, filed Jul. 15, 2013 Non Final Office Action dated Jan. 8, 2016, 41 pages.
Office Action for EP 14160140.1 dated Jan. 19, 2016, 5 pages.
International Search Report and Written Opinion for PCT/GB2015/052570 dated Dec. 11, 2015, 13 pages.
U.S. Appl. No. 14/470,279, filed Aug. 27, 2014, Final Office Action dated Jan. 22, 2016, 25 pages.
U.S. Appl. No. 14/591,474, filed Jan. 7, 2015, Non-Final Office Action dated Feb. 12, 2016, 32 pages.
U.S. Appl. No. 14/494,079, filed Sep. 23, 2014, Preinterview first office action dated Feb. 10, 2016, 6 pages.
U.S. Appl. No. 14/200,864, filed Mar. 7, 2014 Non-Final Office Action dated Feb. 18, 2016, 61 pages.
U.S. Appl. No. 14/479,007, filed Sep. 5, 2014, Final Office Action dated Feb. 22, 2016, 37 pages.
U.S. Appl. No. 14/139,299, filed Dec. 23, 2013, Final Office Action dated Feb. 25, 2016, all pages.
U.S. Appl. No. 14/139,420, filed Dec. 23, 2013 Notice of Allowance dated Mar. 31, 2016, 37 pages.
U.S. Appl. No. 14/470,392, filed Aug. 27, 2014 Final Office Action dated Mar. 4, 2016, all pages.
U.S. Appl. No. 14/470,415, filed Aug. 27, 2014 Final Office Action dated Mar. 3, 2016, all pages.
International Search Report and Written Opinion for PCT/GB2015/052456 dated Jun. 13, 2016, all pages.
U.S. Appl. No. 14/479,007, filed Sep. 5, 2014, Non-Final Office Action dated Jul. 27, 2016, 37 pages.
U.S. Appl. No. 13/942,451, filed Jul. 15, 2013 Final Office Action dated Jun. 22, 2016, all pages.
U.S. Appl. No. 13/919,702, filed Jun. 17, 2013 Non Final Office Action dated Jun. 30, 2016, all pages.
U.S. Appl. No. 14/139,299, filed Dec. 23, 2013, Non Final Office Action dated Jun. 20, 2016, all pages.
U.S. Appl. No. 14/470,415, filed Aug. 27, 2014 Non Final Office Action dated Jul. 29, 2016, all pages.
U.S. Appl. No. 14/470,279, filed Aug. 27, 2014, Non Final Office Action mailed Jul. 19, 2016, all pages.
U.S. Appl. No. 14/470,392, filed Aug. 27, 2014 Non-Final Office Action mailed Aug. 5, 2016, all pages.
U.S. Appl. No. 14/200,864, filed Mar. 7, 2014 Notice of Allowance mailed Sep. 15, 2016, all pages.
U.S. Appl. No. 15/195,527, filed Jun. 28, 2016, Non-Final Rejection dated Sep. 30, 2016, all pages.
U.S. Appl. No. 13/942,451, filed Jul. 15, 2013 Non Final Office Action dated Oct. 25, 2016, all pages.
U.S. Appl. No. 13/919,702, filed Jun. 17, 2013 Final Office Action dated Oct. 28, 2016, all pages.
U.S. Appl. No. 14/470,279, filed Aug. 27, 2014, Notice of Allowance dated Mar. 16, 2017, all pages.
U.S. Appl. No. 14/479,007, filed Sep. 5, 2014, Final Office Action mailed Jan. 23, 2017, all pages.
U.S. Appl. No. 15/195,527, filed Jun. 28, 2016, Notice of Allowance dated Feb. 3, 2017, all pages.
U.S. Appl. No. 14/139,299, filed Dec. 23, 2013, Final Office Action dated Feb. 30, 2017, all pages.
U.S. Appl. No. 14/470,392, filed Aug. 27, 2014, Notice of Allowance dated Feb. 13, 2017, all pages.
International Preliminary Report on Patentability for PCT/GB2015/052456 dated Feb. 28, 2017, all pages.
U.S. Appl. No. 14/470,352, filed Aug. 27, 2014 Non Final Office Action dated Nov. 20, 2015, 28 pages.
U.S. Appl. No. 14/470,352, filed Aug. 27, 2014 Final Office Action dated Mar. 17, 2016, all pages.
U.S. Appl. No. 14/470,352, filed Aug. 27, 2014 Non Final Office Action dated Aug. 26, 2016, all pages.
U.S. Appl. No. 14/470,352, filed Aug. 27, 2014 Notice of Allowance dated Dec. 2, 2016, all pages.
International Search Report and Written Opinion for PCT/GB2015/052457 dated Nov. 13, 2015, 11 pages.
International Preliminary Report on Patentability for PCT/GB2015/052457 dated Feb. 28, 2017, all pages.
U.S. Appl. No. 14/470,279, filed Aug. 27, 2014, Final Office Action dated Dec. 9, 2016, all pages.
U.S. Appl. No. 14/591,474, filed Jan. 7, 2015, Non-Final Office Action dated Dec. 16, 2016, 32 pages.
U.S. Appl. No. 14/479,007, filed Sep. 5, 2014, Non-Final Office Action dated Jun. 1, 2017, all pages.
International Preliminary Report on Patentability for PCT/GB2015/052570 dated Mar. 7, 2017, all pages.
U.S. Appl. No. 14/981,509, filed Dec. 28, 2015, Preinterview first office action dated May 8, 2017, all pages.
U.S. Appl. No. 13/942,451, filed Jul. 15, 2013 Final Rejection dated Apr. 19, 2017, all pages.
U.S. Appl. No. 13/919,702, filed Jun. 17, 2013 Non Final Office Action dated Apr. 28, 2017, all pages.

* cited by examiner

MEDIA CONTENT OUTPUT CONTROL

BACKGROUND

The advent of the digital video recorder and the availability of high-capacity and affordable computer-readable storage devices have made available many possibilities to television programming service providers and viewers alike. Further, viewers have come to expect options in terms of configurability in or for accessing content via their television receivers.

SUMMARY

In an aspect, a method may include or comprise: detecting, by a computing device, a command to tune to particular programming at a time of broadcast of the particular programming by a satellite television provider; determining, by the computing device, whether at least one particular criterion that specifies a condition to attenuate audio of the particular programming as instantly output by an audio output device is applicable; and generating, by the computing device when the at least one particular criterion is applicable, a command to attenuate audio of the particular programming as instantly output by the audio output device to a finite volume level less than that prior the determining.

In an aspect, a television receiver may include or comprise: at least one processor; and at least one memory element communicatively coupled with and readable by at least one processor and having stored therein processor-readable instructions. The processor-readable instructions may when executed by the at least one processor cause the at least one processor to: detect a command to tune to particular programming at a time of broadcast of the particular programming by a satellite television provider; determine whether at least one particular criterion that specifies a condition to attenuate audio of the particular programming as instantly output by an audio output device is applicable; and generate when the at least one particular criterion is applicable a command to attenuate audio of the particular programming as instantly output by the audio output device to a finite volume level.

In an aspect, a method may include or comprise: determining, by a television receiver, that particular criteria that together specifies a condition to attenuate audio of particular programming as instantly output by an audio output device of a presentation device is applicable; generating, by the television receiver, a command to attenuate audio of the particular programming as instantly output by the audio output device to a particular volume level; and modifying, by the television receiver, an audio signal that which is sent to the presentation device to attenuate audio of the particular programming as instantly output by the audio output device.

Other aspects are possible.

DETAILED DESCRIPTION

Figure 1:
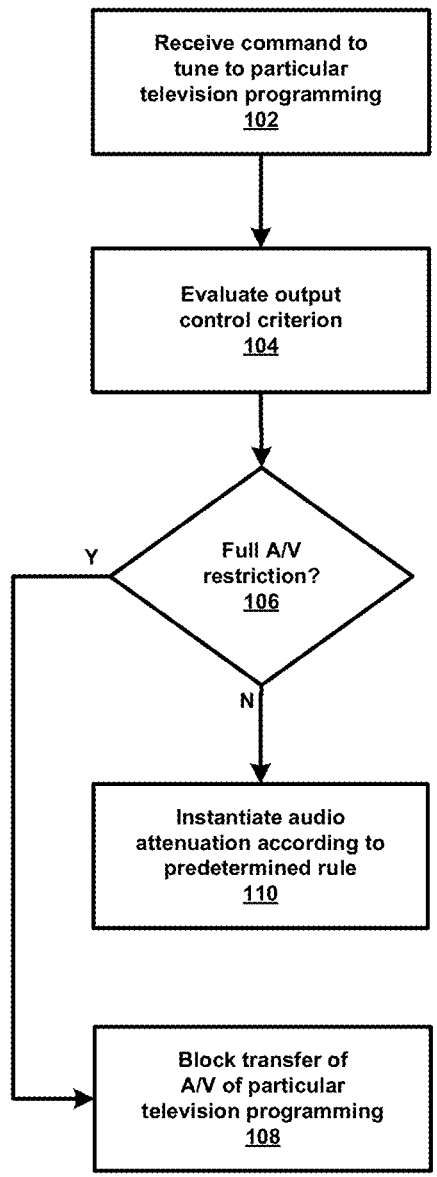
FIG. 1 show an example method according to the disclosure.

The present disclosure is directed to or towards systems and methods for controlling, based upon one or more pre-determined and user-configurable criterion, the loudness or intensity of audio as output by a particular computing device. An example of such a criterion includes time of day. In this example, it is contemplated that, depending on the time of day, a particular computing device may modify or attenuate when applicable the volume of audio as output by that same device, so that the volume does not exceed a pre-determined and user-configurable value or threshold, such as 50% of maximum volume level for instance. In addition, it is contemplated that the various features or aspects of the present disclosure may be incorporated into or within a television receiver as part of a satellite television implementation. This may, among other things, serve to entice new customers to subscribe to services as offered by a particular satellite television provider, as well as provide an incentive for existing customers to maintain their loyalty and/or relationship with the particular satellite television provider. Although not so limited, an appreciation of the various aspects of the present disclosure may be gained from the following discussion in connection with the drawings. For instance, referring now to FIG. 1, a first example method 100 is shown in accordance with the present disclosure.

At step 102, a particular television receiver may receive a command to tune to particular satellite broadcast television programming. For example, a particular user may interact with a handheld device, such as a smartphone or remote control device, to traverse and select particular programming as listed within an EPG (Electronic Programming Guide) via any particular menu-driven, possibly implementation-specific, navigation technique. Here, it might be assumed that the intention of the particular user is to gain immediate access to the particular programming as ultimately output by a presentation device, such as a television or the handheld device itself. It is contemplated that then the television receiver may, and in some examples the handheld device itself, control at least the loudness or intensity of audio as output by the presentation device, based upon one or more pre-determined and user-configurable criterion.

For example, at step 104, the particular television receiver may evaluate particular output control criterion that may be uniquely associated with the presentation device. Here, it is contemplated that the output control criterion may be defined within a configuration file or profile, or the like, that may be uniquely associated with the presentation device. It is further contemplated that the output control criterion may be defined, as desired, and ultimately may be associated with any particular parameter or condition or state, etc., that may be sensed or detected by the particular television receiver itself, and in some examples the handheld device itself. An example of such criterion may include "time of day," such as "after 10 PM" or "between 10 PM and 6 AM" or "between 12 AM and 9 AM on a weekend day," and etc. Another example of such criterion may include "type" of specific content, such as content that may be associated with the "Horror" genre, for example, and/or motion picture rating such as "PG," and etc. Another example of such criterion may be based upon a particular standard such as a "broadcasting watershed," for example, and/or a particular broadcast channel type such as "Adult Pay-Per-View," and etc. It will be appreciated that still many other types of output control criterion is or are possible, and that the audio and/or video output control of the present disclosure may be implemented in light of a single criterion, or any combination thereof.

At step 106, the particular television receiver may initially determine based upon the output control criterion, as discovered at step 104, whether a full or complete restriction is placed upon the particular programming. For example, the particular television receiver may access the above-mentioned configuration file and make a determination as to whether or not the output control criterion dictates that the particular programming in its entirety is unsuitable or otherwise unauthorized for output by the presentation device. For example, a particular rule defined within the configuration file may specify, in plain language, "Deny access to all programming between the hours of 9 PM and 9 AM."

When, for example, the particular television receiver initially determines based upon the output control criterion, as discovered at step 104, that a full or complete restriction is placed upon the particular programming, process flow within the method 100 may branch to step 108. At step 108, the particular television receiver may block transfer or output of the particular programming in its entirety to or by the presentation device. In this manner, the particular television receiver may essentially restrict access to the particular programming on a device-specific basis. This may be beneficial in a parental control scenario, for example, where, or when, a parent provides to their child a smartphone, so that the child may telephone, exchange text messages, email, watch movies that are streamed from a home television receiver, and etc. In this example, certain authentication credentials (e.g. username/password) may be used to "override" the restriction. It will be appreciated that a similar principle may apply in different implementation-specific scenario in which a parent provides to their child a particular television and/or television receiver for the child's room at home.

When, however, the particular television receiver initially determines based upon the output control criterion, as discovered at step 104, that a full or complete restriction is not placed upon the particular programming, process flow within the method 100 may branch to step 110. At step 110, the particular television receiver, or the presentation device itself such as in the above-mentioned smartphone scenario, may modify or attenuate the volume of audio as output by the presentation device, so that the volume does not exceed a pre-determined and user-configurable value. In this example, for simplicity, it may be assumed that the volume of audio as output by the presentation device is currently, or at an instant point in time, greater than or at least equal to the pre-determined and user-configurable value, and that a particular rule having basis in the above-mentioned output control criterion is applicable or valid. For example, a particular instantly applicable rule defined within the configuration file may specify "Between the hours of 9 PM and 9 AM, the volume of audio as output by the presentation device is not to exceed 65% of a maximum volume level of the presentation device."

In this scenario, the particular television receiver may detect or otherwise determine that a current time is "10 PM," for example, and that a current level of the volume of audio as output by the presentation device is "75%" of maximum volume level. In response, it is contemplated that the particular television receiver may attenuate or modify the audio stream as provided or supplied to the presentation device, so that the volume of audio as output by the presentation device is at or about "65%" of a maximum volume level of the presentation device, despite whatever setting the audio volume control of the presentation device itself is adjusted to. For instance, even when the audio volume control of the presentation device is set to "100%" of maximum, for example, the actual volume of audio as output by the presentation device is perceived to be at or about "65%" of a maximum volume level of the presentation device. As discussed in further detail below, it is contemplated that a feedback mechanism in combination with a volume calibration technique may enable the particular television receiver to implement such a feature. In an alternative implementation, it may be unnecessary to leverage one or both of the feedback mechanism and volume calibration technique, such as in the above-mentioned smartphone scenario, also discussed in further detail below.

Such an implementation as discussed in connection with FIG. 1 may be beneficial and/or advantageous in many respects including, for example, such an implementation may assist in compliance with noise abatement laws, protection of minors from adult content, health protection from loud noises, and etc. Additionally, in some examples, a current volume level of audio as output by the presentation device may not factor in. Rather, only a current time of "10 PM," for instance, to continue with the above example scenario, may factor-in to the equation. In this manner, at least one particular criterion may factor-in to the or a decision to attenuate volume. Further scenarios and beneficial aspects associated with controlling, based upon one or more pre-determined and user-configurable criterion, the loudness or intensity of audio as output by a particular computing device are described in detail below in connection with FIGS. 2-7.

Figure 2:
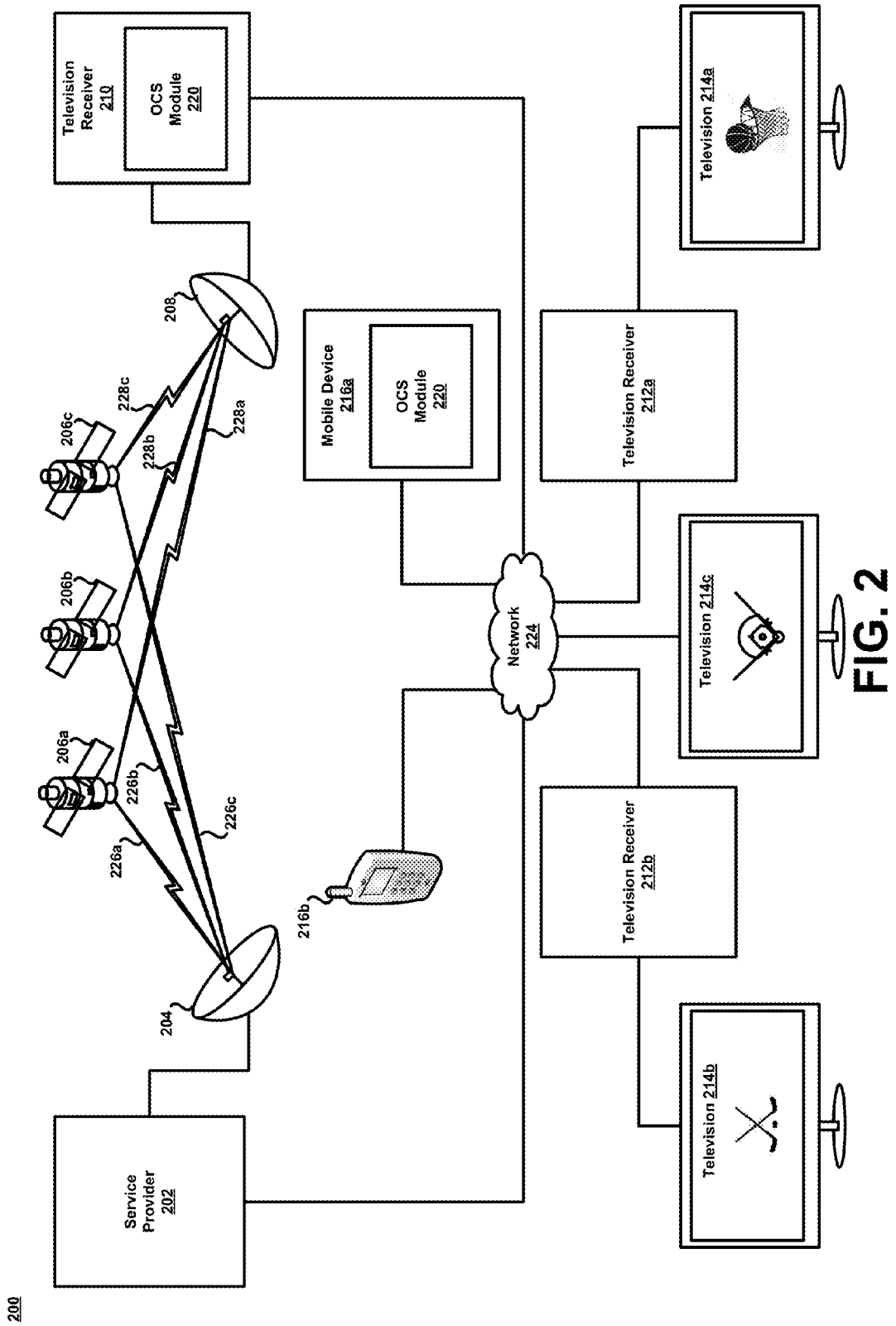
FIG. 2 shows an example satellite system according to the disclosure.

Referring now to FIG. 2, an example satellite television distribution system 200 is shown in accordance with the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of content distribution system.

The example system 200 may include a service provider 202, a satellite uplink 204, a plurality of satellites 206*a-c*, a satellite dish 208, a PTR (Primary Television Receiver) 210, a plurality of STRs (Secondary Television Receivers) 212*a-b*, a plurality of televisions 214*a-c*, a plurality of computing devices 216*a-b*. Additionally, the PTR 210 and each of the computing devices 216*a-b* may include an OCS (Output Control Service) module 220. In general, the OCS module 220 may be configured and/or arranged to implement various features or aspects of the present disclosure associated with controlling, based upon one or more pre-determined and user-configurable criterion, the loudness or intensity of audio as output by a particular computing device, such as for example each one of the plurality of televisions 214*a-c* and also each one of the plurality of computing devices 216*a-b*. Still other benefits and/or advantages are possible as well, and an appreciation of such benefits and/or advantages may be understood in light of the present disclosure in its entirety.

The system 200 may further include at least one network 224 that establishes a bidirectional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 200.

The PTR 210, and the STRs 212a-b, as described throughout may generally be any type of television receiver, television converter, etc., such as a STB for example. In another example, the PTR 210, and the STRs 212a-b, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212a-b and televisions 214a-c, and possibly the computing devices 216a-c, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other embodiments are possible. For example, one or more of the various elements or components of the example system 200 may be configured to communicate in accordance with the MoCA® (Multimedia over Coax Alliance) home entertainment networking standard. Still other embodiments are possible.

In practice, the satellites 206a-c may each be configured to receive uplink signals 226a-c from the satellite uplink 204. In this example, each the uplink signals 226a-c may contain one or more transponder streams of particular data or content, such as one or more particular television channels, as supplied by the service provider 202. For example, each of the respective uplink signals 226a-c may contain various media or media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c.

Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 226a-c to the satellite dish 208 as downlink signals 228a-c. Similar to the uplink signals 226a-c, each of the downlink signals 228a-c may contain one or more transponder streams of particular data or content, such as various encoded and/or at least partially electronically scrambled television channels, on-demand programming, etc., in accordance with an allotted carrier frequency and bandwidth. The downlink signals 228a-c, however, may not necessarily contain the same or similar content as a corresponding one of the uplink signals 226a-c. For example, the uplink signal 226a may include a first transponder stream containing at least a first group or grouping of television channels, and the downlink signal 228a may include a second transponder stream containing at least a second, different group or grouping of television channels. In other examples, the first and second group of television channels may have one or more television channels in common. In sum, there may be varying degrees of correlation between the uplink signals 226a-c and the downlink signals 228a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other embodiments are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently.

For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other embodiments are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or each of the computing devices 216a-b. Similar to the above-examples, the television channel may generally be presented live, or from a recording as previously stored on the PTR 210, and may be output to one or both of the computing devices 216a-c in accordance with a particular content protection technology and/or networking standard.

Figure 3:
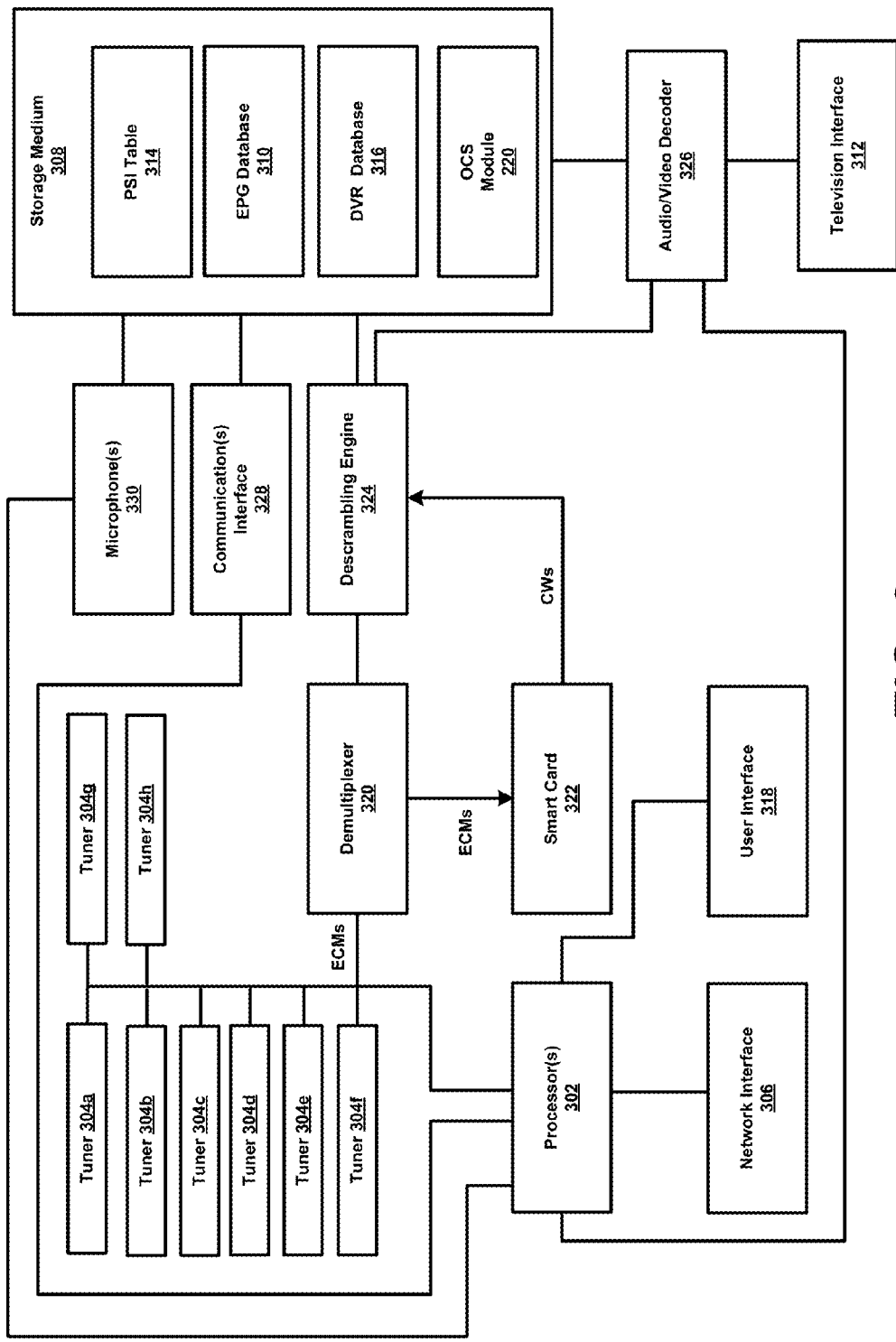
FIG. 3 shows an example block diagram of a television receiver of FIG. 2.

Referring now to FIG. 3, an example block diagram of the PTR 210 of FIG. 2 is shown in accordance with the disclosure. In some embodiments, the STRs 312a-b may be configured in a manner similar to that of the PTR 210. In some embodiments, the STRs 312a-b may be configured and arranged to exhibit a reduced functionality as compared to the PTR 210, and may depend at least to a certain degree on the PTR 210 to implement certain features or functionality. The STRs 312a-b in this example may be each referred to as a "thin client."

The PTR 210 may include one or more processors 302, a plurality of tuners 304a-h, at least one network interface 306, at least one non-transitory computer-readable storage medium 308, at least one EPG (Electronic Programming Guide) database 310, at least one television interface 312, at least one PSI (Program Specific Information) table 314, at least one DVR database 316, at least one user interface 318, at least one demultiplexer 320, at least one smart card 322, at least one descrambling engine 324, at least one decoder 326, at least one communication interface 328, and at least one microphone 330. In other embodiments, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites 306a-c. Each one of the tuners 304a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, sixteen tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 306a-c, which may be unidirectional to the PTR 210, and an another communication channel between the service provider 202 and the PTR 210, which may be bidirectional, may be via the network 224. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the OCS module 220 mentioned above. Recorded television programs may be stored using the storage medium 308.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically or at least intermittently via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304a-h and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some embodiments, the PSI table 314 may be divided into a number of tables, such as a NIT (Network Information Table), a PAT (Program Association Table), and a PMT (Program Management Table).

Table 1 below provides a simplified example of the PSI table 314 for several television channels. It should be understood that in other embodiments, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---|---|---|---|---|---|
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

It should be understood that the values provided in Table 1 are for example purposes only. Actual values, including how satellites and transponders are identified, may vary.

Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 245 of storage medium 308. In some embodiments, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304a-h, television channels received via satellite may contain at least some encrypted or scrambled data. Packets of audio and video may be scrambled to prevent unauthorized users, such as nonsubscribers, from receiving television programming without paying the service provider 202. When one of the tuners 304a-h is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some embodiments, from each ECM received by the smart card 322, two control words are obtained. In some embodiments, when the smart card 322 receives an ECM, it compares the ECM to the previously received ECM. If the two ECMs match, the second ECM is not decrypted because the same control words would be obtained. In other embodiments, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

The communication interface 328 may be used by the PTR 210 to establish a communication link or connection between the PTR 210 and one or more of the computing devices 216a-b as shown in FIG. 2. It is contemplated that the communication interface 328 may take or exhibit any form as desired, and may be configured in a manner so as to be compatible with a like component or element incorporated within or to the computing devices 216a-b, and further may be defined such that the communication link may be wired and/or or wireless. Example technologies consistent with the principles or aspects of the present disclosure may include, but are not limited to, Bluetooth®, WiFi, NFC (Near Field Communication), and/or any other communication device or subsystem similar to that discussed below in connection with FIG. 7. The microphone 330 may be used as an acoustic-to-electric transducer, a corresponding signal of which may be fed to the OCS module 220 to enable the same to approximate an audio volume level as output by a particular computing device, as discussed within the context of this disclosure.

For brevity, the PTR 210 is depicted in a simplified form, and may generally include more or fewer elements or components as desired, including those configured and/or arranged for implementing various features for controlling, based upon one or more pre-determined and user-configurable criterion, the loudness or intensity of audio as output by a particular computing device. For example, the PTR 210 is shown in FIG. 3 to include the OCS module 220 as mentioned above in connection with FIG. 2. While shown stored to the storage medium 308 as executable instructions, the OCS module 220 could, wholly or at least partially, be stored to the processor(s) 302 of the PTR 210. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
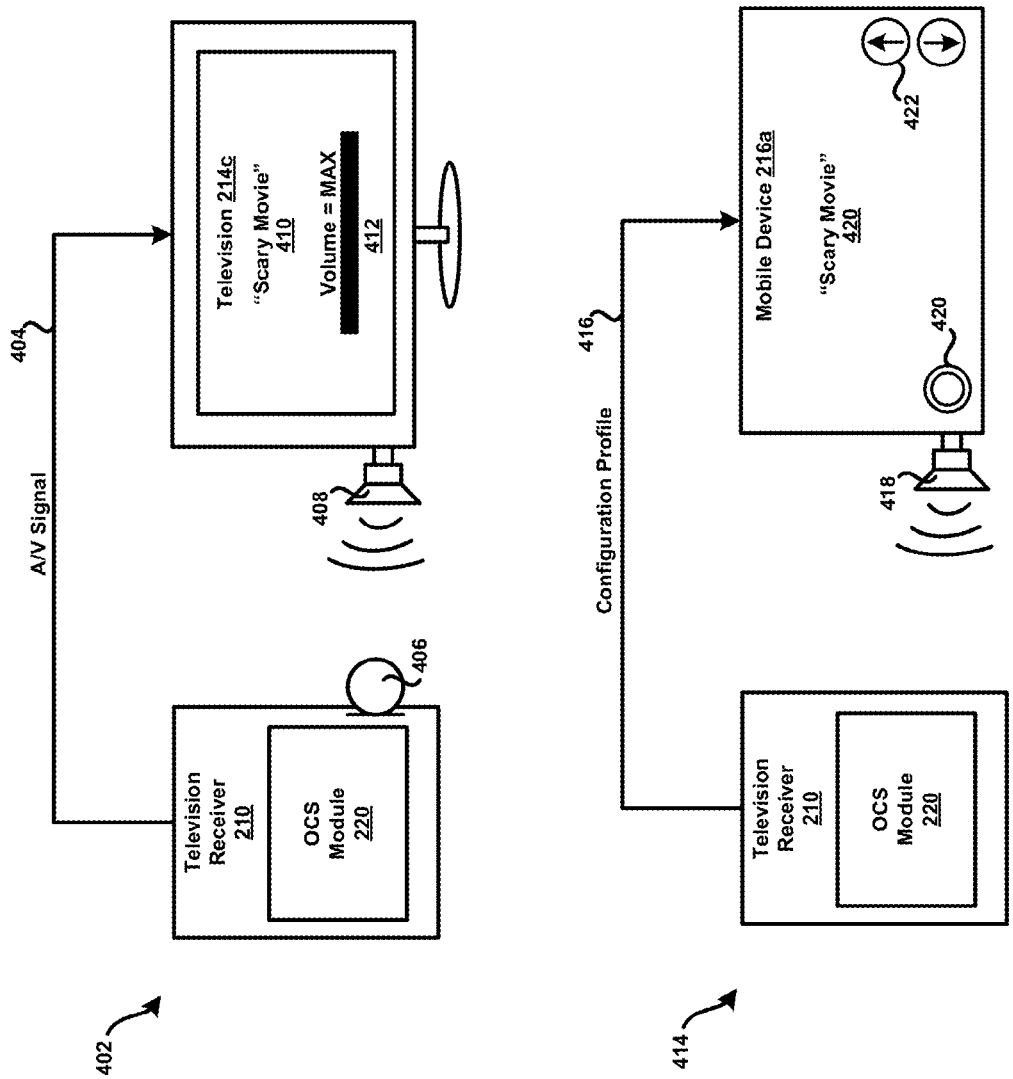
FIG. 4 shows first example aspects of the system of FIG. 2 in detail.

Referring now to FIG. 4, first example aspects of the system 200 of FIG. 2 are shown in detail. For instance, at example implementation 402, a wireless or hardwired communication link 404 is shown to be at least temporarily established between the PTR 210 and the television 214c. Also, the PTR 210 is shown to include or exhibit at least one microphone 406, and the television 214c is shown to include or exhibit at least one speaker 408. Here, it will be appreciated that the microphone 406 of the PTR 210 may "pick-up" audio associated with particular programming 410 as currently or instantly output via the speaker 408 of the television 214c. A signal associated with that detected audio may be then transferred to the OCS module 220 of the PTR 210, so that the same may determine or otherwise estimate a loudness or intensity of the audio associated with the particular programming 410 as currently or instantly output via the speaker 408 of the television 214c.

Figure 6:
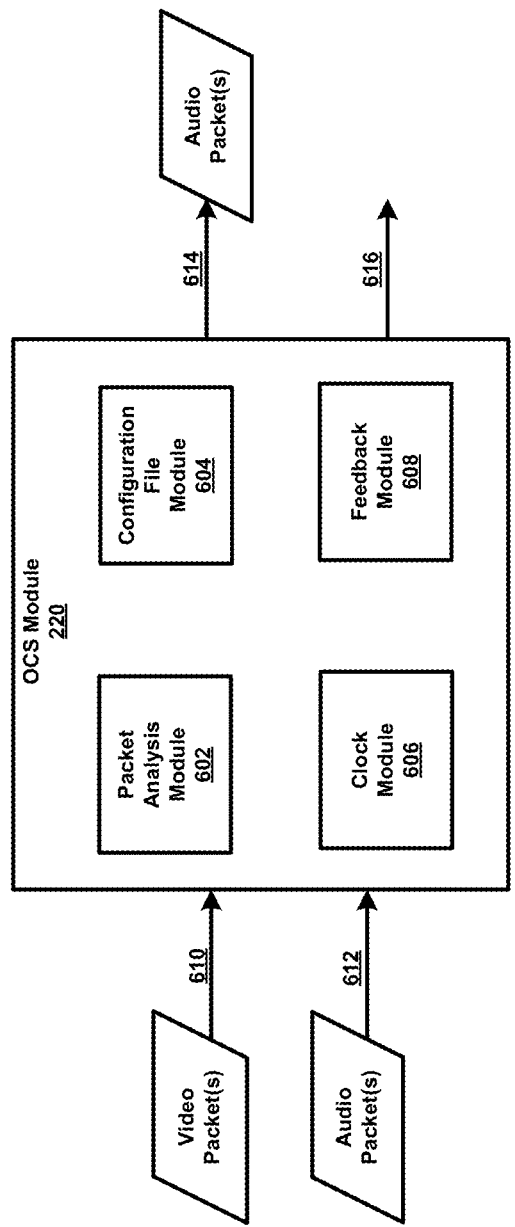
FIG. 6 shows third example aspects of the system of FIG. 2 in detail.

In this example, assuming for the sake of discussion that the loudness or intensity of the audio associated with the particular programming 410 as currently or instantly output via the speaker 408 of the television 214c audio is determined by the OCS module 220 of the PTR 210 to be greater than or at least equal to a pre-determined and user-configurable value, and that a particular output control criterion or criteria is determined by the OCS module 220 of the PTR 210 to be instantly met, the OCS module 220 may attenuate or modify the audio signal or stream as transferred to the television 214c from the PTR 210 over the communication link 404, as discussed in further detail below in connection with at least FIG. 6. In this manner, the OCS module 220 of the PTR 210 may control the volume of audio as output by the television 214c to be at or about a particular pre-determined value, despite whatever finite (e.g., non-mute) setting the audio volume control of the television 214c is itself adjusted to.

For example, in practice, the OCS module 220 of the PTR 210 may, following initial detection of a command to tune to the particular programming 410, evaluate particular output control criterion as defined within a particular configuration file that may be uniquely associated with one or both of the PTR 210 and the television 214*c*, as discussed in further detail below in connection with at least FIG. 5. Next, assume for the sake of discussion that a particular instantly applicable rule, as derived by the OCS module 220 based upon a combination of multiple output control criterion, corresponds to the following: "If genre=Horror, and 7 PM<current time<7 AM (inclusive), then audio volume= 40% of maximum."

In this example, and as discussed in further detail below in connection with at least FIG. 6, assume that the OCS module 220 of the PTR 210 may detect or otherwise determine that a current time is "9:30 PM," that the particular programming 410 is a "Horror" movie, and that a current level of the volume of audio as output by the television 214*c* is about or approximately "80%" of a maximum volume level of the television 214*c*. Here, the OCS module 220 of the PTR 210 may attenuate or modify the audio signal or stream, or at least an aspect thereof, as transferred to the television 214*c* from the PTR 210 over the communication link 404, so that the volume of audio as output by the television 214*c* is at about 40% of maximum, despite whatever finite setting the audio volume control of the television 214*c* itself is currently at or ultimately adjusted to. For instance, even when or if the audio volume control of the television 214*c* is set to "100%," as shown in FIG. 4 by an indicator 412, the actual volume of audio as output by the television 214*c* may still be perceived to be about "40%" of a maximum volume level of the television 214*c*. Other examples are possible as well.

For instance, at example implementation 414 as shown in FIG. 4, a communication link 416 is shown to be at least temporarily established between the PTR 210 and the mobile device 216*a* as introduced in the discussion in connection with FIG. 2. Also, the mobile device 216*a* is shown to include or exhibit at least one speaker 418. An example of such a device may include the iPhone® by Apple, Inc. of Cupertino, Calif. Other examples are however possible. Here, the OCS module 220 of the mobile device 216*a* may acquire from the mobile device 216*a* itself a qualitative parameter that represents a loudness or intensity of audio currently or at an instant time output by the mobile device 216*a* via the speaker 418 (e.g., volume level=6 of 10 "bars"), or, as will be appreciated, a headphone jack 420 of the mobile device 216*a* when headphones is or are coupled thereto. Assuming, for the sake of discussion, that the loudness or intensity of the audio currently being output by the mobile device 216*a* via the speaker 418 is determined to be greater than or equal to a pre-determined and user-configurable value, and that a particular output control criterion or criteria is determined by the OCS module 220 of the mobile device 216*a* to be instantly met, the OCS module 220 may modify or attenuate the audio as output by the mobile device 216*a*, so that the volume of audio as output by the mobile device 216*a* is at or about a particular pre-determined value, despite whatever finite setting the audio volume control of the mobile device 216*a* is itself adjusted to.

For example, in practice, the OCS module 220 of the PTR 210 may initially, at a prior point in time, push to the OCS module 220 of the mobile device 216*a* over the communication link 416 a particular configuration file that may be uniquely associated with one or both of the PTR 210 and the mobile device 216*a*, as discussed in further detail below in connection with at least FIG. 5. Next, following initial detection of a command to tune to particular programming 420 as shown in FIG. 4, the OCS module 220 of the mobile device 216*a* may evaluate particular output control criterion as defined within the particular configuration file. In this example, assume for simplicity that the same instantly applicable rule mentioned above in connection with example implementation 402 applies, as derived by the OCS module 220 of the mobile device 216*a* though. Here, the OCS module 220 of the mobile device 216*a* may modify or attenuate the audio as output by the speaker 418 of the mobile device 216*a* so that same is at about 40% of maximum, despite whatever finite (i.e., non-mute) setting the audio volume control of the mobile device 216*a* itself is currently at or ultimately adjusted to. For instance, even when a particular depressible control 422 of the mobile device 216*a* is actuated with the intention to increase volume level to a maximum volume level, for example, the actual volume of audio as output by the mobile device 216*a* is not changed or remains unchanged and may be perceived to be at about "40%" of a maximum volume level of the mobile device 216*a*. In practice, such volume adjustment may be implemented in substantially real-time, where in general the OCS module 220 may be configured and/or arranged to attenuate and amplify where the OCS module 220 could for example the total amount of "noise" over a period of time, e.g. 2 seconds, and attenuate/amplify accordingly so quite "portions" become louder, and loud "portions" become quieter.

Figure 5:
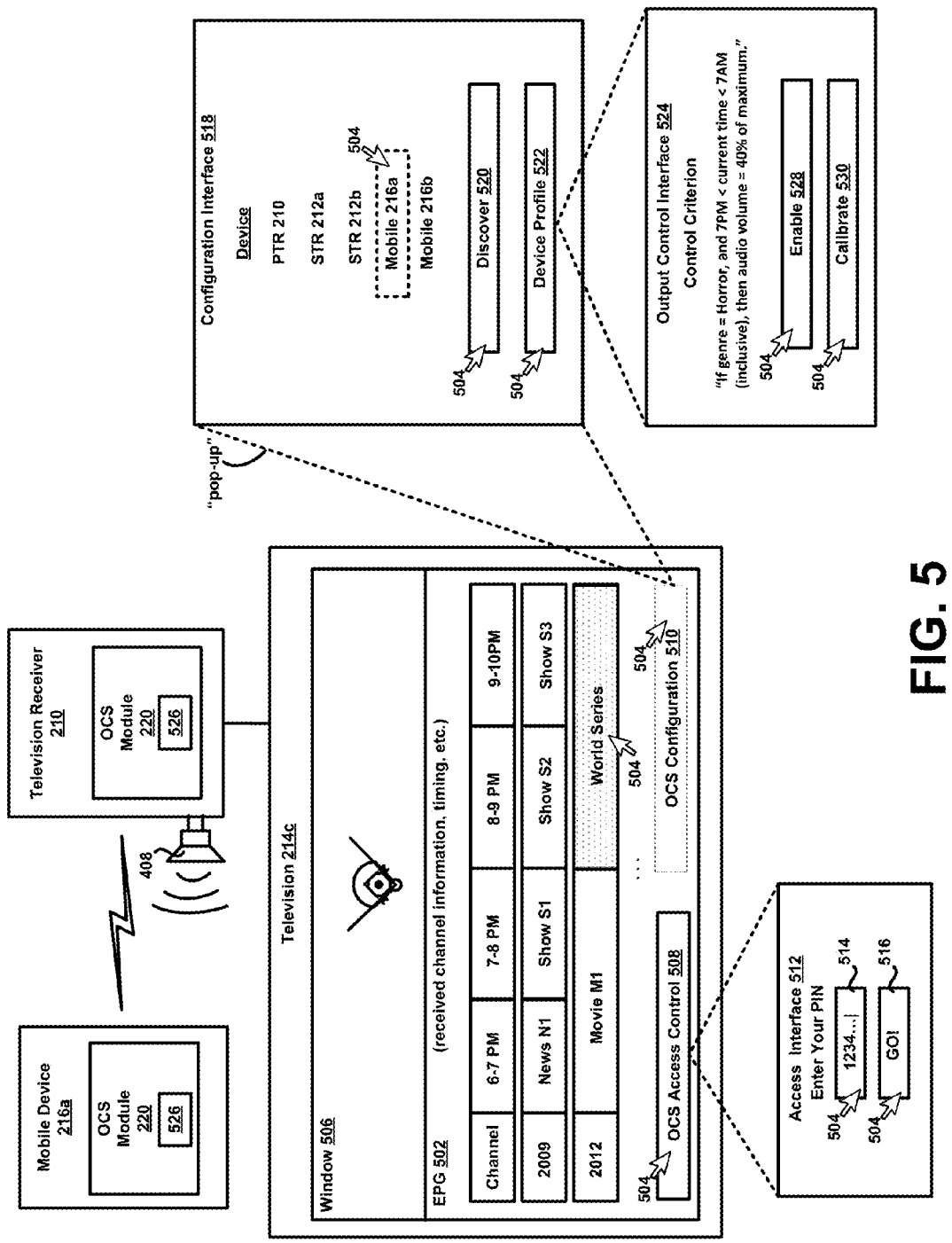
FIG. 5 shows second example aspects of the system of FIG. 2 in detail.

Referring now to FIG. 5, second example aspects of the system 200 of FIG. 2 are shown in detail. In particular, the PTR 210 may be configured to output an EPG (Electronic Programming Guide) 502 to and for presentation the television 214*c*, for example. The EPG 502 may at least present various information related to television channels and the timing of programs or programming appearing on such television channels. For example, as shown in FIG. 5, the EPG 502 may display information associated with a channel 2012, where the "World Series" is listed as scheduled to appear on that channel starting at a particular time on a particular day, and etc. In this example, and assuming that a current time is sometime during the time period 8-10 PM, a viewer may manipulate a cursor 504 using a pointing device (not shown) to select, as indicated by stipple shading in FIG. 5, the World Series for immediate viewing within a window 506 on the television 214*c*. Other examples are possible. For example, it is contemplated that any menu-driven navigation technique or implementation may be used to enable user-interaction with the EPG 502, along with any other elements or interfaces output by the PTR 210 to the television 214*c*.

In addition to the EPG 502, the PTR 210 may be configured to output various other interactive elements or interfaces. For example, the OCS module 220 of the PTR 210 may be configured to output a control selection 508 and a configuration selection 510, as shown in FIG. 5. In general, the control selection 508 may be considered an access control mechanism to prevent those who may not necessarily be authorized from accessing functionality associated with the configuration selection 510. An example in which this may be beneficial is in a parental control scenario. For example, a parent may provide a minor (e.g., their child) the mobile device 216*a*, also as shown in FIG. 5, so that the minor has the ability to place phone calls, check email, text, listen to music, stream movies as supplied by the PTR 210 that serves as a source, and etc. It is contemplated though that the parent may wish for the child to benefit from the aspects of the present disclosure, and further to have control as to how the aspects of the present disclosure apply at or during use of the mobile device 216*a*, without having to worry about tampering or disabling or circumvention of the same by the minor.

Accordingly, in practice, the control selection 508 may be selected in order to gain access to a particular interface so that the OCS module 220 of the mobile device 216a may function according to the wishes of a particular individual (e.g., a parent). For example, the particular individual may manipulate the cursor 504 to select the control selection 508, via a "point and double-click" action, for example and, in response, the OCS module 220 of the PTR 210 may output an access interface 512 to and for presentation by the television 214c. In this example, the access interface 512 may include a prompt "Enter Your PIN" along with a data field 514 and an enter selection 516. Here, the particular individual may enter into the data field 514 an alphanumeric sequence, or the like, and then select the enter selection 516 in effort to gain access to functionality associated with the configuration selection 510.

Assuming that the above-mentioned alphanumeric sequence is authenticated by the OCS module 220 of the PTR 210 following the described sequence, the configuration selection 510 may become "active" so that upon selection of the same a configuration interface 518 may be output to and for presentation by the television 214c. In FIG. 5, the configuration selection 510 is shown as "inactive," indicated by a perimeter line that is weighted less than that of the control selection 508, or by a perimeter line that is lighter in terms of boldness than that of the control selection 508. When the configuration selection 510 becomes active the perimeter line of the same would be similar to that of the control selection 508 as shown in FIG. 5.

Again, assuming that the alphanumeric sequence is authenticated by the OCS module 220 of the PTR 210 following the described sequence, the particular individual may manipulate the cursor 504 to select the configuration selection 510 and, in response, the OCS module 220 of the PTR 210 may output the configuration interface 518 to and for presentation by the television 214c. Here, it is contemplated that the particular individual may utilize the configuration interface 518 to configure the OCS module 220 of any particular device (e.g., mobile device 216a), as desired, so as to implement one or more features or aspects of the present disclosure. For instance, in one example, the configuration interface 518 may include a device discover selection 520 and a device profile selection 522. The configuration interface 518 as shown in FIG. 5 is just an example. Other examples may include more or fewer "selections" as desired, and may be implementation-specific, and further may evolve as technology evolves.

In practice, the device discover selection 520 may be selected to pair or otherwise establish a communication link or connection between the PTR 210 and any of the other devices as introduced in FIG. 2 that may have installed thereto a corresponding OCS module 220 and, when successfully "paired," a corresponding device may be listed, possibly persistently, within the configuration interface 518. For example, as shown in FIG. 5, the device discover selection 520 may be selected to pair or otherwise establish a communication link or connection between the PTR 210 and the mobile device 216a, and then an indicator that identifies the mobile device 216a is shown within the configuration interface 518. In this manner, an individual may interact with the television 214c, and ultimately the PTR 210, to program or configure at least the mobile device 216a, as desired, to implement various features or aspects of the present disclosure. As mentioned above, this may, among other things, serve to entice new customers to subscribe to services as offered by a particular satellite television provider, as well as provide an incentive for existing customers to maintain their loyalty and/or relationship with the particular satellite television provider.

Next, but not necessarily so, the individual may configure the OCS module 220 of the mobile device 216a to implement various features or aspects of the present disclosure. For example, the indicator that identifies the mobile device 216a as shown within the configuration interface 518 may initially be selected, as indicated by intermittent line in FIG. 5, and then the device profile selection 522 may be selected to enable and define if desired (e.g., default parameter values are contemplated) one or more criterion that when met under certain circumstance may trigger the OCS module 220 of the mobile device 216a to modify or attenuate the loudness or intensity of audio as output by a particular computing device of the mobile device 216a, similar to that as discussed throughout. Additionally, it will be appreciated that a similar process may be performed to enable and define if desired (e.g., default parameter values are contemplated) one or more criterion that when met under certain circumstance may trigger the OCS module 220 of any of the particular devices listed within the configuration interface 518 to modify or attenuate the loudness or intensity of audio as output by an associated device in accordance with the principles of the present disclosure.

For example, the individual may manipulate the cursor 504 to select the device profile selection 522 as shown within the configuration interface 518 and, in response, the OCS module 220 of the PTR 210 may output a control interface 524 to and for presentation by the television 214c. In this example, the control interface 524 may be used or utilized to define a particular configuration profile 526 that is uniquely associated with the mobile device 216a, but is periodically or at least intermittently served to the mobile device 216a by the PTR 210 which itself may function as a central repository that stores, updates, etc., a particular configuration profile for each and every one of the devices as listed within the configuration interface 518.

In practice, the individual may define via the control interface 524 one or more criterion that when met under certain circumstance may trigger the OCS module 220 of the mobile device 216a to modify or attenuate the loudness or intensity of audio as output by the mobile device 216a. For instance, and keeping with the example discussed above in connection with at least FIG. 4, the individual may define or enter via the control interface 524 as shown in FIG. 5 the following "If genre=Horror, and 7 PM<current time<7 AM (inclusive), then audio volume=40% of maximum." While shown coded as or in an if-then construct, it is contemplated that the one or more criterion may be entered into the control interface 524 using any particular construct or syntax as desired, and that the same may be implementation-specific and evolve as technology itself evolves. Next, the individual may manipulate the cursor 504 to select an enable selection 528 as shown within the control interface 524 to populate the particular configuration profile 526 that is uniquely associated with the mobile device 216a, that which may be utilized when pushed to the mobile device 126a to ultimately program the OCS module 220 of the mobile device 216a to modify or attenuate the loudness or intensity of audio as output by the mobile device 216a, in accordance with the criterion or criteria as shown.

Also shown within the control interface 524 is a calibrate selection 530. As briefly discussed above in connection with at least FIG. 1, in some implementations a feedback mechanism in combination with a volume calibration technique may be performed so as to enable the PTR 210 to implement one or more features or aspects of the present disclosure. It is contemplated that such an implementation may correspond to that of the example implementation 402 as discussed above in connection with FIG. 4. This is because the television 214c in some examples may not necessarily have the capacity to be programmed to include or exhibit an OCS module 220 whereas, in contrast, the PTR 210, STRs 212a-b, and computing devices 216a-b as shown in FIG. 2 may typically have the capacity to be programmed to include or exhibit an OCS module 220. Accordingly, it may beneficial in some examples to "train" a particular OCS module 220, such as the OCS module 220 of the PTR 210 to detect and quantify the loudness or intensity of audio as output by the television 214c, for example.

For example, assuming that the indicator that identifies the PTR 210 is initially selected within the configuration interface 518, and then the device profile selection 522 is selected so as to generate the control interface 524, to enable define the individual to define a particular configuration profile that is uniquely associated with the PTR 210, it is contemplated that the calibrate selection 530 may be selected to train the OCS module 220 of the PTR 210 to detect and quantify the loudness or intensity of audio as output by the television 214c, for example. For example, when the calibrate selection 530 is selected a prompt (not shown) may include an instruction to "Turn the volume up to 100% of maximum value for 10 seconds, then press record on your remote control device," so that that OCS module 220 of the PTR 210 may be programmed to detect and quantify maximum loudness or intensity of audio as output by the television 214c.

Following this baseline calibration of maximum loudness, the prompt may then include an instruction to "Turn the volume to 50% of maximum value for 10 seconds, then press record on your remote control device," so that that OCS module 220 of the PTR 210 may be programmed to detect and quantify half maximum loudness or intensity of audio as output by the television 214c. Last, following calibration of half maximum loudness, the prompt may then include an instruction to "Turn the volume to 0% of maximum value for 10 seconds, then press record on your remote control device," so that that OCS module 220 of the PTR 210 may be programmed to detect and quantify minimum loudness or intensity of audio as output by the television 214c. Subsequently, the OCS module 220 of the PTR 210 may, using these three data points, extrapolate a function that describes loudness or intensity of audio as output by the television 214c. Then, in practice, the OCS module 220 of the PTR 210 may implement the volume and/or audio output control features or aspects of the present disclosure in a manner similar to that as discussed above in connection with FIG. 4 in connection with example implementation 402.

Referring now to FIG. 6, third example aspects of the system 200 of FIG. 2 are shown in detail. In particular, FIG. 6 depicts a number of modules, including a packet analysis module 602, a configuration file module 604, a clock module 606, and a feedback module 608, of an instance of the OCS module 220 as described throughout. The configuration of the OCS module 220 as shown in FIG. 6 is just an example. Other examples may include more or fewer modules or elements as desired, and may be implementation-specific, and further may evolve as technology evolves. It is however contemplated that the configuration of the OCS module 220 as shown in FIG. 6 is applicable to both the example implementation 402 and the example implementation 414 as discussed above in connection with FIG. 4.

In practice, it is contemplated that the packet analysis module 602 may receive as input a video packet stream 610 and an audio packet stream 612. In general, the video packet stream 610 and the audio packet stream 612 may each correspond to or be associated with a particular instance of programming, such as the particular programming 410 or the particular programming 420 as shown in FIG. 4 above. With initial reference to the example implementation 402 of FIG. 4, and then to the example implementation 414 below, the packet analysis module 602 may be configured to parse particular packets of the video packet stream 610 to derive information therefrom. That information may be encoded within packets of the video packet stream 610 in the form of metadata or "tags" that may generally describe the particular programming 410. Examples of information contained within such metadata or tags may include: Content Title; Content Type; Content Rating; Actor Information; Director Information; and etc. Here, it is contemplated that such information as derived from the video packet stream 610 may enable the OCS module 220 in this example to control at least the loudness or intensity of audio as output by the television 214c.

For instance, and to continue with the above-example discussed in connection with example implementation 402, assume that a particular instantly applicable rule, as derived by the OCS module 220 based upon a combination of multiple output control criterion contained within the configuration file module 604, corresponds to the following: "If genre=Horror, and 7 PM<current time<7 AM (inclusive), then audio volume=40% of maximum." Here, the clock module 606 may detect or otherwise determine that a current time is "9:30 PM," the packet analysis module 602 may detect or otherwise determine that the particular programming 410 is a "Horror" movie, and the feedback module 608 may detect or otherwise determine that a current level of the volume of audio as output by the television 214c is about or approximately "80%" of a maximum volume level of the television 214c.

In response, the OCS module 220 may modify a particular "loudness" parameter as encoded within particular packets of the audio packet stream 612 so as to generate a modified audio packet stream 614 that is then transferred to the television 214c over the communication link 404. Here, it is contemplated that the particular "loudness" parameter as encoded within packets of the modified audio packet stream 614 when decoded by the television 214c may be used to control the volume of audio as output by the television 214c to be at or about 40% of maximum volume level, despite whatever finite setting the audio volume control of the television 214c itself is currently at or ultimately adjusted to. In instances in which the configuration file module 604 includes the rule "Deny access to all programming between the hours of 9 PM and 9 AM" s mentioned above in connection with FIG. 1, the OCS module 220 may block both video packet stream 610 and the modified audio packet stream 614 from being transferred to the television 214c over the communication link 404.

Further, in a scenario corresponding to example implementation 414, the feedback module 608 may detect or otherwise determine directly from an operating system, for example, of the mobile device 216a, that a current level of the volume of audio as output by the mobile device 216a is about or approximately "80%" of a maximum volume level of the mobile device 216a, and then a control signal 616 may be output by the OCS module 220 may be used to control the volume of audio as output by the mobile device 216a to be at or about 40% of maximum volume level, despite whatever finite setting the audio volume control of the mobile device 216a c itself is currently at or ultimately adjusted to.

Figure 7:
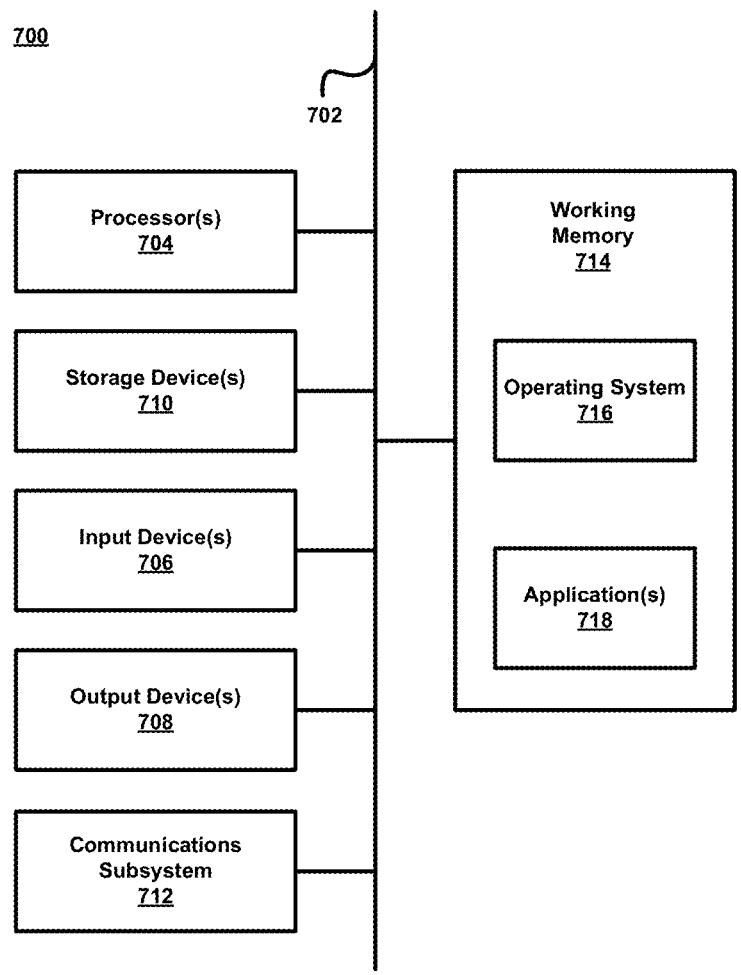
FIG. 7 shows an example computing system or device.

FIG. 7 shows an example computer system or device 700 in accordance with the disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 700, such as any of the respective elements of at least FIG. 2. In this manner, any of one or more of the respective elements of at least FIG. 2 may be configured and/or arranged, wholly or at least partially for controlling, based upon one or more pre-determined and user-configurable criterion, the loudness or intensity of audio as output by a particular computing device. For example, any of one or more of the respective elements of at least FIG. 2 may be configured and/or arranged to perform and/or include instructions that, when executed, perform the method of FIG. 1. Still further, any of one or more of the respective elements of at least FIG. 2 may be configured to perform and/or include instructions that, when executed, instantiate and implement functionality of the PTR 210 and/or the computing devices 216a-b.

The computer device 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which may include without limitation a remote control, a mouse, a keyboard, and/or the like; and one or more output devices 708, which may include without limitation a presentation device (e.g., television), a printer, and/or the like.

The computer system 700 may further include (and/or be in communication with) one or more non-transitory storage devices 710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 700 might also include a communications subsystem 712, which may include without limitation a modem, a network card (wireless and/or wired), an infrared communication device, a wireless communication device and/or a chipset such as a Bluetooth™ device, 702.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 712 may permit data to be exchanged with a network (such as the network described below, to name one example), other computer systems, and/or any other devices described herein. In many embodiments, the computer system 700 will further comprise a working memory 714, which may include a random access memory and/or a read-only memory device, as described above.

The computer device 700 also may comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 700) to perform methods in accordance with various embodiments of the disclosure. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as the working memory 714.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

It should further be understood that the components of computer device 700 can be distributed across a network. For example, some processing may be performed in one location using a first processor while other processing may be performed by another processor remote from the first processor. Other components of computer system 700 may be similarly distributed. As such, computer device 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   detecting, by a computing device, a command to instantiate a feedback-based volume calibration routine for determining an audio output loudness function for audio output by a first presentation device;
   instantiating, by the computing device, the feedback-based volume calibration routine to determine the audio output loudness function for the first presentation device using a microphone of the computing device;
   generating, by the computing device, an interface for display on the first presentation device, the interface for establishing configuration profiles for different presentation devices;
   generating, by the computing device, a configuration profile for a second presentation device different from the first presentation device, wherein generating the configuration profile includes receiving input, at the computing device, defining one or more output control criterion for the second presentation device including a first particular output control criterion;
   detecting, by the computing device, a command to tune to a particular programming at a time of broadcast of the particular programming by a television provider;
   receiving, by the computing device, an audio stream and a video stream corresponding to the particular programming;
   identifying, by the computing device, metadata associated with the particular programming;
   establishing, by the computing device, a communication link with the second presentation device;
   transmitting, by the computing device to the second presentation device over the communication link, the configuration profile for the second presentation device;

determining, by the computing device, that the first particular output control criterion is applicable for the second presentation device, wherein the first particular output control criterion specifies conditions for blocking the particular programming from output in its entirety by one or more presentation devices, and wherein determining that the first particular output control criterion is applicable for the second presentation device includes comparing the metadata with the first particular output control criterion;

preventing, by the computing device, output of the audio stream and the video stream by the second presentation device based on the first particular output control criterion being applicable for the second presentation device;

determining, by the computing device, that the first particular output control criterion is not applicable for the first presentation device;

determining, by the computing device, that a second particular output control criterion is applicable for the first presentation device, wherein the second particular output control criterion specifies a condition for attenuating audio of the particular programming as instantly output by the first presentation device, and wherein determining that the second particular output control criterion is applicable for the first presentation device includes comparing the metadata with the second particular output control criterion;

generating, by the computing device, a modified audio stream from the audio stream corresponding to the particular programming using the audio output loudness function, wherein the modified audio stream exhibits a finite volume level less than a volume level of the received audio stream, wherein generating the modified audio stream includes determining an audio loudness parameter of packets of the audio stream, increasing, in real-time, the audio loudness parameter of packets of the audio stream that fall below a particular threshold and decreasing, in real-time, the audio loudness parameter of packets of the audio stream that fall above the particular threshold, and wherein generating the modified audio stream from the audio stream corresponding to the particular programming includes changing the audio loudness parameter of packets of the audio stream using the audio output loudness function;

facilitating, by the computing device, output of the modified audio stream and the video stream by the first presentation device;

determining, by the computing device, that the first particular output control criterion is applicable for the first presentation device; and generating, by the computing device, a command to discontinue output of audio and video of the particular programming by the first presentation device based on determining that the first particular output control criterion is applicable for the first presentation device.

2. The method of claim 1, further comprising:
detecting, by a television receiver, the command to instantiate the feedback-based volume calibration routine;
instantiating, by the television receiver, the feedback-based volume calibration routine to determine the audio output loudness function using a microphone of the television receiver;
detecting, by the television receiver, the command to tune to the particular programming at the time of broadcast of the particular programming by a television provider;
receiving, by the television receiver, the audio stream and the video stream corresponding to the particular programming;
determining, by the television receiver, that the second particular output control criterion is applicable;
generating, by the television receiver, the modified audio stream using the audio output loudness function; and
outputting, by the television receiver, a video signal including the video stream and the modified audio stream to a television that exhibits the first presentation device for outputting the modified audio stream that exhibits the finite volume level less than the volume level of the received audio stream.

3. The method of claim 1, further comprising:
detecting, by a handheld mobile device that exhibits the first presentation device, the command to instantiate the feedback-based volume calibration routine;
instantiating, by the handheld mobile device, the feedback-based volume calibration routine to determine the audio output loudness function using a microphone of the handheld mobile device;
detecting, by the handheld mobile device, the command to tune to particular programming at the time of broadcast of the particular programming by a television provider;
receiving, by the handheld mobile device, the audio stream and the video stream corresponding to the particular programming;
determining, by the handheld mobile device, that the second particular output control criterion is applicable;
generating, by the handheld mobile device, the modified audio stream using the audio output loudness function; and
outputting, by the handheld mobile device, the modified audio stream by adjusting a volume control of the handheld mobile device to match the finite volume level less than the volume level of the received audio stream.

4. The method of claim 1, wherein generating includes creating the modified audio stream by attenuating audio of the particular programming in the received audio stream to a level according to the audio output loudness function that is a fraction of a maximum level of volume for output of audio by the first presentation device.

5. The method of claim 1, wherein the computing device is a television receiver.

6. The method of claim 1, wherein the computing device is a handheld mobile device.

7. The method of claim 1, further comprising:
receiving a definition of the second particular output control criterion that specifies the condition to attenuate audio of the particular programming as instantly output by the first presentation device; and
storing the definition to a particular persistent memory location for subsequent access therefrom.

8. The method of claim 1, wherein generating includes:
controlling in real-time, by the computing device, the finite volume level of the modified audio stream so that audio of the particular programming as instantly output by the first presentation device remains unchanged when an output volume level setting of the first presentation device is changed.

9. The method of claim 1, wherein the feedback-based volume calibration routine prompts a user to set an output volume level setting for the first presentation device to a first particular value, to set the output volume level setting for the first presentation device to a second particular value less than the first particular value, and to set the output volume level setting for the first presentation device to a third particular value less than the second particular value, and wherein determining the audio output loudness function for the first presentation device includes detecting, using the microphone, audio output for the first presentation device when the output volume level is set to the first particular value, the second particular value, and the third particular value and extrapolating the audio output loudness function using detected audio levels.

10. The method of claim 1, wherein instantiating the feedback-based volume calibration routine includes:
    generating, by the computing device, a prompt to set an instant audio output level of the first presentation device to a first level;
    detecting and quantifying, using the microphone of the computing device, the instant audio output level corresponding to the first level;
    generating, by the computing device, a prompt to set the instant audio output level of the first presentation device to a second level;
    detecting and quantifying, using the microphone of the computing device, the instant audio output level corresponding to the second level; and
    extrapolating, by the computing device, the audio output loudness function using the detected and quantified instant audio output levels corresponding to at least the first and second levels.

11. The method of claim 1, wherein the second particular output control criterion is selected from: a particular time of day; a particular type of content of the particular programming; and a particular broadcast channel that carries the particular programming at the time of broadcast of the particular programming by the television provider.

12. A television receiver, comprising:
    at least one processor;
    an output device for transmitting an output stream, wherein the output device is communicatively coupled with the at least one processor; and
    at least one memory element communicatively coupled with and readable by at least one processor and having stored therein processor-readable instructions that, when executed by the at least one processor, cause the at least one processor to perform operations including:
        detecting a command to instantiate a feedback-based volume calibration routine for determining an audio output loudness function for audio output by a first presentation device;
        instantiating the feedback-based volume calibration routine to determine the audio output loudness function for the first presentation device;
        generating an interface for display on the first presentation device, the interface for establishing configuration profiles for different presentation devices;
        generating a configuration profile for a second presentation device different from the first presentation device, wherein generating the configuration profile includes receiving input defining one or more output control criterion for the second presentation device including a first particular output control criterion;
        detecting a command to tune to a particular programming at a time of broadcast of the particular programming by a television provider;
        receiving an audio stream and a video stream corresponding to the particular programming;
        identifying metadata associated with the particular programming;
        establishing a communication link with the second presentation device;
        transmitting, to the second presentation device over the communication link, the configuration profile for the second presentation device;
        determining that the first particular output control criterion is applicable for the second presentation device, wherein the first particular output control criterion specifies conditions for blocking the particular programming from output in its entirety by one or more presentation devices, and wherein determining that the first particular output control criterion is applicable for the second presentation device includes comparing the metadata with the first particular output control criterion;
        preventing output of the audio stream and the video stream by the second presentation device, based on the first particular output control criterion being applicable for the second presentation device;
        determining that the first particular output control criterion is not applicable for the first presentation device;
        determining that a second particular output control criterion is applicable for the first presentation device, wherein the second particular output control criterion specifies a condition for attenuating audio of the particular programming as instantly output by the first presentation device, and wherein determining that the second particular output control criterion is applicable for the first presentation device includes comparing the metadata with the second particular output control criterion;
        generating a modified audio stream from the audio stream corresponding to the particular programming using the audio output loudness function, wherein the modified audio stream exhibits a finite volume level less than a volume level of the received audio stream, wherein generating the modified audio stream includes determining an audio loudness parameter of packets of the audio stream, increasing, in real-time, the audio loudness parameter of packets of the audio stream that fall below a particular threshold and decreasing, in real-time, the audio loudness parameter of packets of the audio stream that fall above the particular threshold, and wherein generating the modified audio stream from the audio stream corresponding to the particular programming includes changing the audio loudness parameter of packets of the audio stream using the audio output loudness function;
        outputting the modified audio stream and the video stream using the output device for presentation by the first presentation device;
        determining that the first particular output control criterion is applicable for the first presentation device; and
        generating a command to discontinue output of audio and video of the particular programming by the first presentation device based on determining that the first particular output control criterion is applicable for the first presentation device.

13. The television receiver of claim 12, wherein the operations include:
    outputting a video signal including the video stream and the modified audio stream to a television that exhibits the first presentation device.

14. The television receiver of claim 12, wherein the operations include:
  generating the modified audio stream, wherein the modified audio stream exhibits the finite volume level that is a particular predefined fraction of a maximum level of volume for output of audio by the first presentation device.

15. The television receiver of claim 12, wherein the operations include:
  receiving a definition of the second particular output control criterion that specifies the condition to attenuate audio of the particular programming as instantly output by the first presentation device; and
  storing the definition to a particular persistent memory location for subsequent access therefrom.

16. The television receiver of claim 12, wherein the feedback-based volume calibration routine prompts a user to set an output volume level setting for the first presentation device to a first particular value, to set the output volume level setting for the first presentation device to a second particular value less than the first particular value, and to set the output volume level setting for the first presentation device to a third particular value less than the second particular value, and wherein determining the audio output loudness function for the first presentation device includes detecting, using a microphone of the television receiver, audio output for first the presentation device when the output volume level is set to the first particular value, the second particular value, and the third particular value and extrapolating the audio output loudness function using detected audio levels.

17. The television receiver of claim 12, wherein the operations include:
  detecting input corresponding to activation of the second particular output control criterion that specifies the condition to attenuate audio of the particular programming as instantly output by an audio output device.

18. The television receiver of claim 12, wherein the operations include:
  deriving an instant output level of volume of audio output by the first presentation device; and
  determining that the second particular output control criterion is applicable when the instant output level of volume of audio output by the first presentation device is estimated to be greater than or equal to a predetermined threshold value.

19. The television receiver of claim 12, wherein the second particular output control criterion is selected from: a particular time of day and an instant volume level of audio output by the first presentation device; a particular type of content of the particular programming and an instant volume level of audio output by the first presentation device; and a particular broadcast channel that carries the particular programming at the time of broadcast of the particular programming by the television provider and an instant volume level of audio output by the first presentation device.

20. A method, comprising:
  detecting, by a television receiver, a command to instantiate a feedback-based volume calibration routine for determining an audio output loudness function for audio output by a first presentation device;
  instantiating, by the television receiver, the feedback-based volume calibration routine to determine the audio output loudness function for the first presentation device;
  generating, by the television receiver, an interface for display on the first presentation device, the interface for establishing configuration profiles for different presentation devices;
  generating, by the television receiver, a configuration profile for a second presentation device different from the first presentation device, wherein generating the configuration profile includes receiving input, at the television receiver, defining one or more output control criterion for the second presentation device including a second particular output control criterion;
  determining, by the television receiver, that a first particular output control criterion that specifies a condition to attenuate audio of particular programming as instantly output by the first presentation device is applicable;
  receiving, by the television receiver, an audio stream and a video stream corresponding to the particular programming;
  identifying, by the television receiver, metadata associated with the particular programming;
  establishing, by the television receiver, a communication link with the second presentation device;
  transmitting, by the television receiver to the second presentation device over the communication link, the configuration profile for the second presentation device;
  determining, by the television receiver, that the second particular output control criterion is applicable for the second presentation device, wherein the second particular output control criterion specifies conditions for blocking the particular programming from output in its entirety by one or more presentation devices, and wherein determining that the second particular output control criterion is applicable for the second presentation device includes comparing the metadata with the second particular output control criterion;
  preventing, by the television receiver, output of the audio stream and the video stream by the second presentation device, based on the second particular output control criterion being applicable for the second presentation device;
  determining, by the television receiver, that the second particular output control criterion is not applicable for the first presentation device;
  generating, by the television receiver, a modified audio stream from the audio stream corresponding to the particular programming, wherein the modified audio stream exhibits a finite volume level according to the audio output loudness function that is a particular predetermined fraction of a maximum level of volume for output of audio by the first presentation device, wherein generating the modified audio stream includes determining an audio loudness parameter of packets of the audio stream, increasing, in real-time, the audio loudness parameter of packets of the audio stream that fall below a particular threshold and decreasing, in real-time, the audio loudness parameter of packets of the audio stream that fall above the particular threshold, and wherein generating the modified audio stream from the audio stream corresponding to the particular programming includes changing the audio loudness parameter of packets of the audio stream using the audio output loudness function;
  outputting, by the television receiver, an audio signal that is sent to the first presentation device for instantly outputting the modified audio stream;

determining, by the television receiver, that the first particular output control criterion is applicable for the first presentation device; and generating, by the television receiver, a command to discontinue output of audio and video of the particular programming by the first presentation device based on determining that the first particular output control criterion is applicable for the first presentation device.

* * * * *